US012745766B2

(12) United States Patent
Schofield

(10) Patent No.: US 12,745,766 B2
(45) Date of Patent: Sep. 29, 2026

(54) TREE STAND WITH SEAT LEVELING SHELF LOCK

(71) Applicant: Double Dragon International, Inc., Dubuque, IA (US)

(72) Inventor: Randy L. Schofield, Harrisburg, MO (US)

(73) Assignee: Double Dragon International, Inc., Dubuque, IA (US)

( * ) Notice: Subject to any disclaimer, the term of this patent is extended or adjusted under 35 U.S.C. 154(b) by 1053 days.

(21) Appl. No.: 17/839,052

(22) Filed: Jun. 13, 2022

(65) Prior Publication Data

US 2023/0404062 A1 Dec. 21, 2023

(51) Int. Cl.
*A01M 31/02* (2006.01)

(52) U.S. Cl.
CPC .................................. *A01M 31/02* (2013.01)

(58) Field of Classification Search
CPC .................................................. A01M 31/02
See application file for complete search history.

(56) References Cited

U.S. PATENT DOCUMENTS 3,065,821 A * 11/1962 Hundley, Jr. ......... A01M 31/02 182/187
3,885,649 A 5/1975 Damron
3,949,835 A 4/1976 Butler
4,113,057 A 9/1978 Bessinger
4,120,379 A 10/1978 Carter
4,124,094 A 11/1978 Cande
4,148,376 A * 4/1979 Campbell, Jr. ........... A45F 3/04 182/20
4,582,165 A * 4/1986 Latini ................... A01M 31/02 182/20
4,720,029 A 1/1988 Varanakis
4,727,961 A 3/1988 Dawson
4,776,503 A * 10/1988 Sink .................... A01M 31/025 182/187
4,836,938 A 6/1989 Kobasic
4,989,766 A 2/1991 Lewallyn et al.
5,060,756 A 10/1991 D'Acquisto
5,105,910 A 4/1992 Engstrom (Continued)

OTHER PUBLICATIONS

Lone Wolf Lightweight Hang-on Stand (GAOS 2019), (Feb. 8, 2019), (https://www.youtube.com/watch?app=desktop&v=0TCZ2LdVxJI) (downloaded Jun. 13, 2022).

(Continued)

*Primary Examiner* — David E Martinez
(74) *Attorney, Agent, or Firm* — Rathe Lindenbaum LLP

(57) ABSTRACT

A tree stand may include a platform, a post pivotable between an upright position relative to the platform and a folded position along the platform, a seat pivotable between a seat position and a shelf position, a leveling tab extending from the post, a shelf tab extending from the post, and a seat leveling shelf lock movably connected to and projecting from the seat The seat is pivotable between a first position in which the seat leveling shelf lock engages the leveling tab to establish an angle of the seat relative to the post in the seat position while the post is in the upright position and a second position in which the seat leveling shelf lock engages the shelf tab to retain the seat in the shelf position while the post is in the folded position.

20 Claims, 6 Drawing Sheets

(56) References Cited

U.S. PATENT DOCUMENTS

| | | | | |
|---|---|---|---|---|
| 5,265,780 | A * | 11/1993 | Matthews | A45F 4/02 182/187 |
| 5,462,135 | A | 10/1995 | Ambler et al. | |
| 5,695,099 | A | 12/1997 | Strum | |
| 5,975,389 | A | 11/1999 | Braun et al. | |
| 6,085,868 | A * | 7/2000 | Anthony | A01M 31/02 182/187 |
| 6,170,609 | B1 | 1/2001 | Dech | |
| 6,464,118 | B2 | 10/2002 | McUmber | |
| 6,520,291 | B2 | 2/2003 | Andrey | |
| 6,547,035 | B1 | 4/2003 | D'Acquisto | |
| 6,662,981 | B2 | 12/2003 | McUmber | |
| 6,722,472 | B2 | 4/2004 | Berkbuegler | |
| 8,534,423 | B1 | 9/2013 | Brabham | |
| 8,631,906 | B2 | 1/2014 | Phillips | |
| 8,991,555 | B2 | 3/2015 | Furseth et al. | |
| 8,997,933 | B2 | 4/2015 | Furseth et al. | |
| 9,027,709 | B2 | 5/2015 | Wheelington | |
| 9,137,982 | B2 | 9/2015 | Yoder | |
| 9,938,734 | B1 * | 4/2018 | Garis | E04G 5/067 |
| 10,582,704 | B2 | 3/2020 | Wheelington | |
| 10,653,129 | B2 | 5/2020 | Check | |
| 10,798,937 | B2 | 10/2020 | Berry et al. | |
| 10,973,224 | B2 | 4/2021 | Infalt et al. | |
| D943,117 | S | 2/2022 | D'Acquisto | |
| 11,330,813 | B2 | 5/2022 | Power et al. | |
| 11,602,213 | B1 | 3/2023 | Leach et al. | |
| 2001/0023794 | A1 | 9/2001 | Andrey | |
| 2002/0100778 | A1 | 8/2002 | McUmber | |
| 2003/0000974 | A1 | 1/2003 | McUmber | |
| 2003/0192741 | A1 | 10/2003 | Berkbuegler | |
| 2008/0073151 | A1 | 3/2008 | Boepple | |
| 2008/0128204 | A1 | 6/2008 | Engstrom | |
| 2010/0126803 | A1 | 5/2010 | Cama | |
| 2011/0180351 | A1 | 7/2011 | Cama | |
| 2011/0297481 | A1 | 12/2011 | Copus | |
| 2012/0080267 | A1 | 4/2012 | Furseth et al. | |
| 2012/0080269 | A1 | 4/2012 | Furseth et al. | |
| 2012/0181110 | A1 | 7/2012 | Browning | |
| 2015/0053503 | A1 | 2/2015 | Richey et al. | |
| 2015/0181860 | A1 | 7/2015 | Johnson | |
| 2016/0338341 | A1 | 11/2016 | Thevenet | |
| 2018/0192634 | A1 | 7/2018 | Check | |
| 2019/0053483 | A1 | 2/2019 | Infalt et al. | |
| 2019/0055782 | A1 | 2/2019 | Infalt et al. | |
| 2020/0253190 | A1 | 8/2020 | D'Acquisto | |
| 2021/0084889 | A1 | 3/2021 | Berry et al. | |
| 2021/0227819 | A1 | 7/2021 | Infalt et al. | |
| 2021/0329908 | A1 | 10/2021 | Barry et al. | |
| 2021/0386181 | A1 | 12/2021 | Farmer, II | |

OTHER PUBLICATIONS

Hush Stand Review | Out on a Limb | Mobile Hunting Stand, (Jul. 19, 2021), (https://www.youtube.com/watch?app=desktop&v=DUfaBZVVaiU) (downloaded Jun. 13, 22).

The HUSH Lightweight Tree Stand W/Mass Pursuit TV &Chace Stalker of OOAL (Jul. 22, 2021) (https://www.youtube.com/watch?v=KtL5_pAtAVs), (downloaded Jun. 13, 2022).

* cited by examiner

TREE STAND WITH SEAT LEVELING SHELF LOCK

BACKGROUND

Tree stands typically include a platform upon which a person may stand. Some tree stands additionally include a secondary platform that serves as a seat. As such tree stands are often used in remote areas, transporting such tree stands and other gear is often difficult.

Figure 1:
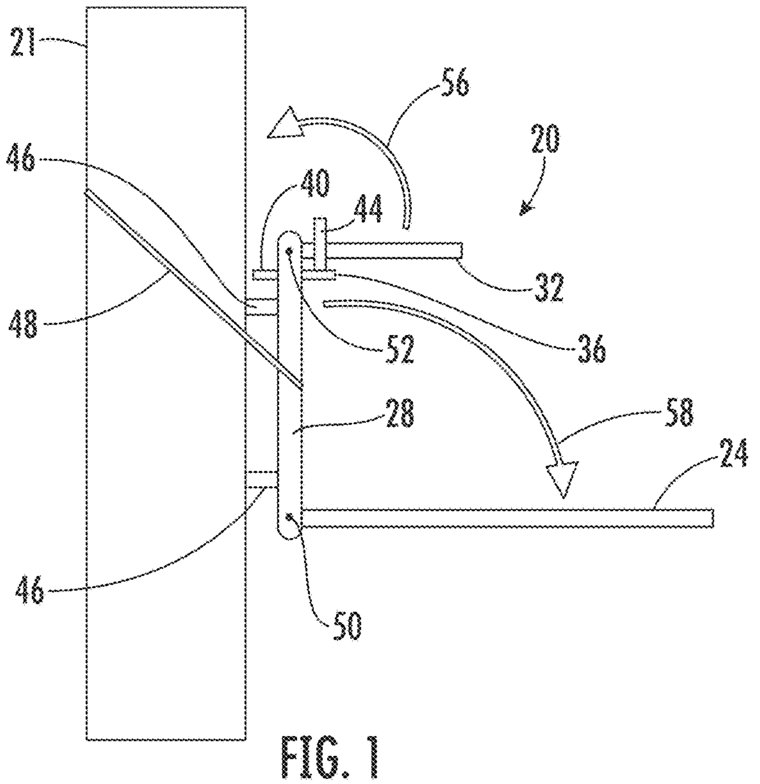
FIG. 1 is a side view schematically illustrating portions of an example tree stand supported by a tree and having a seat in a seat position.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example tree stands that facilitate easier transport of the tree stand and additional gear. The example tree stands are collapsible or foldable to a state where the tree stand may be carried along a person's back using shoulder straps, similar to a backpack. The example tree stands are foldable in a fashion such that the seat of the tree stand may serve as a shelf for supporting the additional gear when the tree stand is folded and carried along the person's back. In some implementations, the seat is pivotable by at least 180 degrees between a seat position and a shelf position. The example tree stands comprise a dual-purpose seat leveling shelf lock that engages a leveling tab to establish the orientation of the seat when the tree stand is in use and that engages a shelf tab to retain the seat in the shelf position when the tree stand is folded for transport.

Disclosed is an example tree stand that comprises a platform, a post pivotable between an upright position relative to the platform and a folded position along the platform, a seat pivotable between a seat position and a shelf position, a leveling tab extending from the post, a shelf tab extending from the post, and a seat leveling shelf lock movably connected to and projecting from the seat. The seat is pivotable between a seat position in which the seat leveling shelf lock engages the leveling tab to establish an angle of the seat relative to the post in the seat position while the post is in the upright position and a shelf position in which the seat leveling shelf lock engages the shelf tab to retain the seat in the shelf position while the post is in the folded position.

In some implementations, the leveling tab and the shelf tab extend from opposite sides of the post and wherein the leveling tab is offset relative to shelf along a longitudinal axis of the post. In some implementations, the leveling tab, the shelf tab, and the post are integrally formed as a single unitary body. In some implementations, the leveling tab, the shelf tab, and/or the post are cast from aluminum as a single unitary body.

In some implementations, the seat leveling shelf lock is removable from the seat. In some implementations, the seat leveling shelf lock extends through the shelf tab while the post is in the folded position. In some implementations, the seat comprises an internally threaded bore and wherein the seat leveling shelf lock comprises an external thread, the seat leveling shelf lock being threaded through the internally threaded bore and being translatable by rotation of the seat leveling shelf lock relative to the seat. In some implementations, the seat leveling shelf lock extends through the shelf tab while the post is in the folded position.

In some implementations, the tree stand further comprises a shoulder strap connectable to at least one of the platform and the post when the post is in the folded position and while the seat is in the shelf position.

Disclosed is an example method for transporting a tree stand. The example method comprises pivoting a post of the tree stand from an upright position to a folded position along the platform, pivoting a seat of the tree stand from a seat position on a first side of the post overhanging the platform to a shelf position on a second side of the post opposite the first side, engaging a leveling tab projecting from the post with a seat leveling shelf lock projecting from the seat with the seat in the seat position, and engaging a shelf tab projecting from the post with the seat leveling shelf lock projecting from the seat with the seat in the shelf position. In some implementations, the method may further comprise threading the seat leveling shelf lock through the seat into engagement with the leveling tab when the seat is in the seat position and threading the seat leveling shelf lock through the seat while the seat leveling shelf lock is engaged to the shelf tab to retain the seat in the shelf position.

FIG. 1 is a diagram schematically illustrating portions of an example tree stand 20 mounted along a trunk 21 of an example tree. Tree stand 20 facilitates easier transport of the tree stand and additional gear. Tree stand 20 is collapsible or foldable to a state such that the tree stand may be carried along a person's back using shoulder straps, similar to a backpack. Tree stand 20 is foldable in a fashion such that the seat of the tree stand may serve as a shelf for supporting the additional gear when the tree stand is folded and carried along the person's back. Tree stand 20 utilizes a dual-purpose seat leveling shelf lock that controls the orientation of the seat to accommodate personal preferences or to accommodate mounting of the stand to non-vertical portions of the tree. The dual-purpose seat leveling shelf lock further locks or retains the seat in a shelf position or orientation when the tree stand is folded and being transported. Tree stand 20 comprises platform 24, post 28, seat 32, leveling tab 36, shelf tab 40 and seat leveling shelf lock 44.

Platform 24 comprises a panel or other structure upon which a person residing on tree stand 20 may stand and/or rest his or her feet. In some implementations, platform 24 may comprise an open grill or framework. In some implementations, platform 24 may comprise an imperforate panel. Platform 24 is supported by post 28.

Post 28 comprise an elongate structure that spaces and supports platform 24 and seat 32 along the example trunk 21. In some implementations, post 28 additionally supports claw structures 46 that extend between post 28 in the sides of trunk 21. In some implementations, post 28 is further secured to trunk 21 by a strap or cord 48 that wraps about trunk 21. Post 28 is pivotably connected to platform 24 for pivoting movement about axis 50 such that post 28 may pivot between the upright position relative to platform 24 and shown in FIG. 1 and a folded position (shown in FIG. 2).

Figure 2:
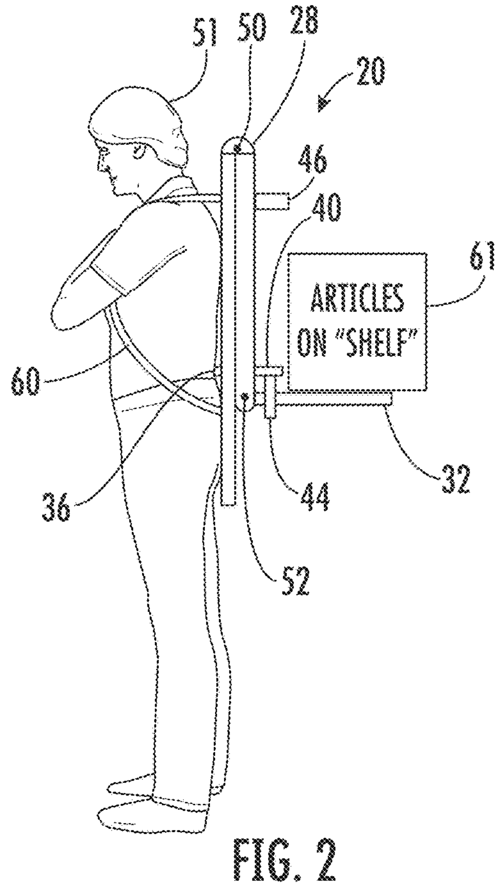
FIG. 2 is a side view schematically illustrating portions of the example tree stand of FIG. 1 in a folded state while being transported by a person with the seat in a shelf position.

Seat 32 comprises a platform upon which a person may be seated. Seat 32 is supported by post 28 so as to overhanging extend above platform 24 when seat 32 is in the seat position shown in FIG. 1. Seat 32 is pivotably coupled to post 28 for pivotal movement about axis 52 such that seat 32 may pivot from the seat position shown in FIG. 1 to a shelf position as shown in FIG. 2.

Leveling tab 36 comprises a projection that extends from post 28 below pivot axis 52 (when seat 32 is oriented above platform 24 in the seat position). Leveling tab 36 is sized and located so as to be engageable by seat leveling shelf lock 44 when seat 32 is in the seat position shown in FIG. 1. In some implementations, tab 36 is integrally formed as a single unitary body with post 28. In some implementations, tab 36 is removably or fixedly mounted to post 28.

Shelf tab 40 comprises a projection that extends from post 28 on an opposite side of post as leveling tab 36. Shelf tab 40 is sized and located so as to be engageable by seat leveling shelf lock 44 when seat 32 is in the shelf position shown in FIG. 2. In some implementations, shelf tab 40 is integrally formed as a single unitary body with post 28. In some implementations, shelf tab 40 is removably or fixedly mounted to post 28.

Seat leveling shelf lock 44 comprises structure that is movably connected to and projects from seat 32. Lock 44 may be moved relative to seat 32 to adjust the length of lock 44 extending between leveling tab 36 and seat 32 to affect the angular positioning of seat 32 and to retain seat 32 in a selected angular position (about axis 52). For example, in some implementations, seat 32 may be retained in an orientation perpendicular to the longitudinal axis of post 28 (such as when trunk 21 does not extend at an angle). In some implementations, lock 44 may cooperate with tab 36 to retain seat 32 in a downwardly tilted orientation or an upwardly tilted orientation to accommodate the preferences of the person using seat 32. In some implementations, lock 44 may cooperate with tab 36 retain seat in a downwardly tilted orientation relative to post 28 or an upwardly tilted orientation relative to post 28 such that seat 32 is horizontal despite post 28 being tilted due to trunk 21 being tilted (not perpendicular to the horizon).

FIG. 2 illustrates tree stand 20 in a collapsed or folded state while being worn by a person 51. To move tree stand 20 from the in-use state shown in FIG. 1 to the collapsed or folded state shown in FIG. 2, seat 32 is pivoted about axis 52 in the direction indicated by arrow 56 shown in FIG. 1. Seat 32 is pivoted to a position such that lock 44 may engage shelf tab 40. In some implementations, lock 44 snaps or otherwise releasably connects to shelf lock 44 to retain in the shelf position shown in FIG. 2. In some implementations, lock 44 may be screwed or threaded into a threaded bore provided in shelf tab 40. In some implementations, lock 44 may be passed through a bore in shelf tab 40, wherein lock 44 is secured by a nut threaded onto the end of the lock 44 (configured as a bolt). In some implementations, lock 44 may be detached from seat 32 and reconnected, joining shelf tab 40 and seat 32 when or after seat 32 has been pivoted to overlie shelf tab 40. In some implementations, lock 44 comprises a threaded bolt which may be unscrewed or unthreaded from seat 32 and which is threaded in an upward direction (as seen in FIG. 1) through shelf tab 40 and upwards into a threaded bore provided in seat 32 or threaded into a nut provided on a top side of seat 32 while seat 32 overlies shelf tab 40.

To further move tree stand 20 to the collapsed or folded state, post 28 is pivoted about axis 50 in the direction indicated by arrow 58 shown in FIG. 1. This results in post 28 being close to parallel or parallel with platform 24. In some implementations, platform 24 is provided with openings for receiving portions of stand 20 which would otherwise inhibit post 28 from lying in close proximity and parallel or near parallel to platform 24. For example, platform 24 may include an opening to receive leveling tab 36 when post 28 is pivoted to the folded position shown in FIG. 2.

As shown by FIG. 2, when tree stand 20 is in the collapsed or folded state, platform 24 forms a back backing, wherein post 28 extends substantially down the center of platform 24 and wherein seat 32 projects outwardly from post 28 and from platform 24 to serve as a shelf. As shown by FIG. 2, tree stand 20 may additionally include a shoulder strap 60 connectable at opposite ends to at least one of platform 24 and/or post 28 to facilitate carrying of tree stand 20 in a fashion similar to a backpack. As shown by FIG. 2, articles 61 may rest upon seat 32. In some implementations, additional securement mechanism may be provided on seat 32, such as cleats, projections, or the like, to facilitate securement of such articles on the shelf provided by seat 32 with bungee cords, straps or the like.

Figure 3:
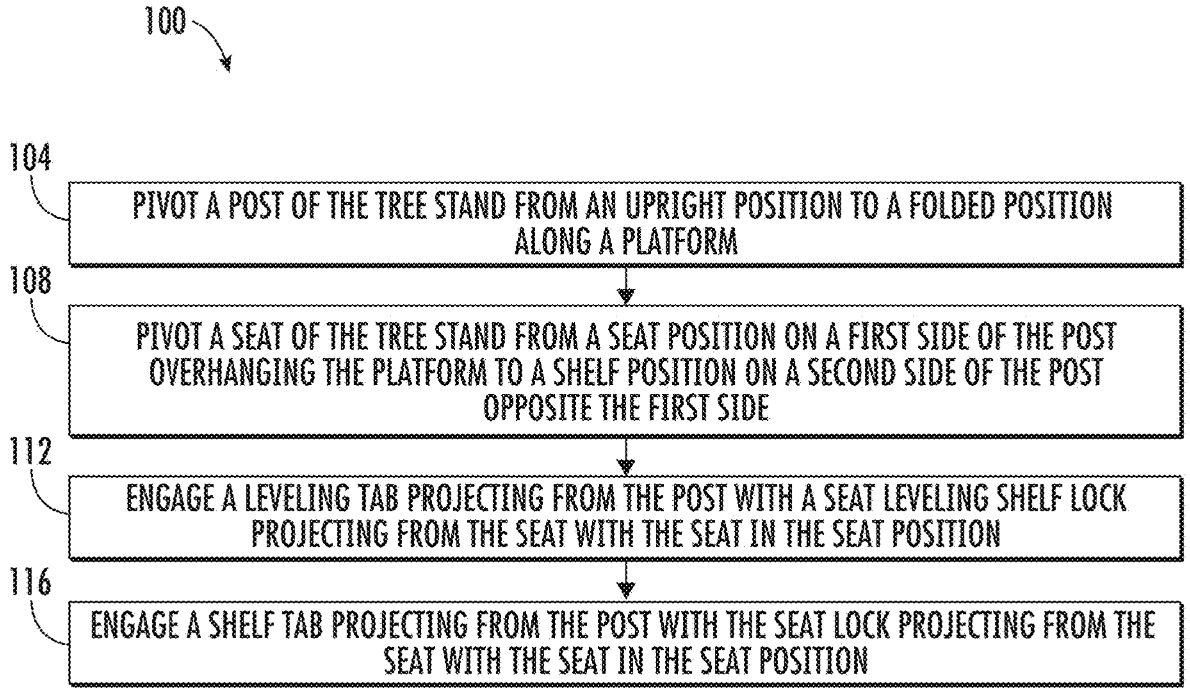
FIG. 3 is a flow diagram of an example method for transporting a tree stand.

FIG. 3 is a flow diagram of an example method 100 for transporting a tree stand, such as tree stand 20. Although method 100 is described in the context of being carried out with tree stand 20, method 100 may likewise be carried out with any of the following later described tree stands or with similar tree stands. As indicated by block 104, a post of a tree stand is pivoted from an upright position to a folded position along a platform. As discussed above with respect to tree stand 20, post 28 is pivoted from the upright position shown in FIG. 1 to the folded position along platform 24 as shown in FIG. 2.

As indicated by block 108, a seat of the tree stand is pivoted from a seat position on a first side of the post overhanging the platform to a shelf position on a second side of the post opposite the first side. As discussed above with respect to tree stand 20, seat 32 is pivoted about axis 52 from a seat position shown in FIG. 1 on a first side of the post 28, overhanging the platform 24, to a shelf position on a second side of post 28 opposite the first side as seen in FIG. 2.

As indicated by block 112, a leveling tab projecting from the post is engaged with a seat leveling shelf lock projecting from the seat with a seat in the seat position. As discussed above with respect to tree stand 20, leveling tab 40 is engaged with seat leveling shelf lock projecting from the seat 32 with the seat 32 in the seat position shown in FIG. 1. In some implementations, seat leveling shelf lock 44 has a lower surface that simply rests (under the force of gravity) upon the top surface of leveling tab 36. In some implementations lock 44 may include a nut threaded onto a bolt, wherein the nut rests upon the top surface of leveling tab 36. In some implementations, seat leveling shelf lock 44 may engage seat 32 in other fashions. For example, seat leveling shelf lock 44 may be threaded into a threaded bore provided in leveling tab 36. In some implementations, seat leveling shelf lock 44 may be threaded through seat 32, wherein rotation of lock 44 linearly translates lock 44 to adjust an extent of lock 44 projecting below seat 32 and into engagement with leveling tab 36 so as to adjust the orientation of seat 32.

As indicated by block 116, the shelf tab projecting from the post is engaged with the seat leveling shelf lock projecting from the seat with the seat in the shelf position. As discussed above with respect to tree stand 20, shelf tab 40, projecting from post 28, is engaged with the seat leveling shelf lock 44 projecting from the seat 32 with the seat in the shelf position as shown in FIG. 2. As discussed above, in some implementations, lock 44 snaps or otherwise releasably connects to shelf lock 44 to retain in the shelf position shown in FIG. 2. In some implementations, lock 44 may be screwed or threaded into a threaded bore provided in shelf tab 40. In some implementations, lock 44 may be passed through a bore in shelf tab 40, wherein lock 44 is secured by a nut threaded onto the end of the lock 44 (configured as a bolt with the nut). In some implementations, lock 44 may be detached from seat 32 and reconnected, joining shelf tab 40 and seat 32 when or after seat 32 has been pivoted to overlie shelf tab 40. In some implementations, lock 44 comprises a threaded bolt which may be unscrewed or unthreaded from seat 32 and which is threaded in an upward direction (as seen in FIG. 1) through shelf tab 40 and upwards into a threaded bore provided in seat 32 or threaded into a nut provided on a top side of seat 32 while seat 32 overlies shelf tab 40.

Figure 4:
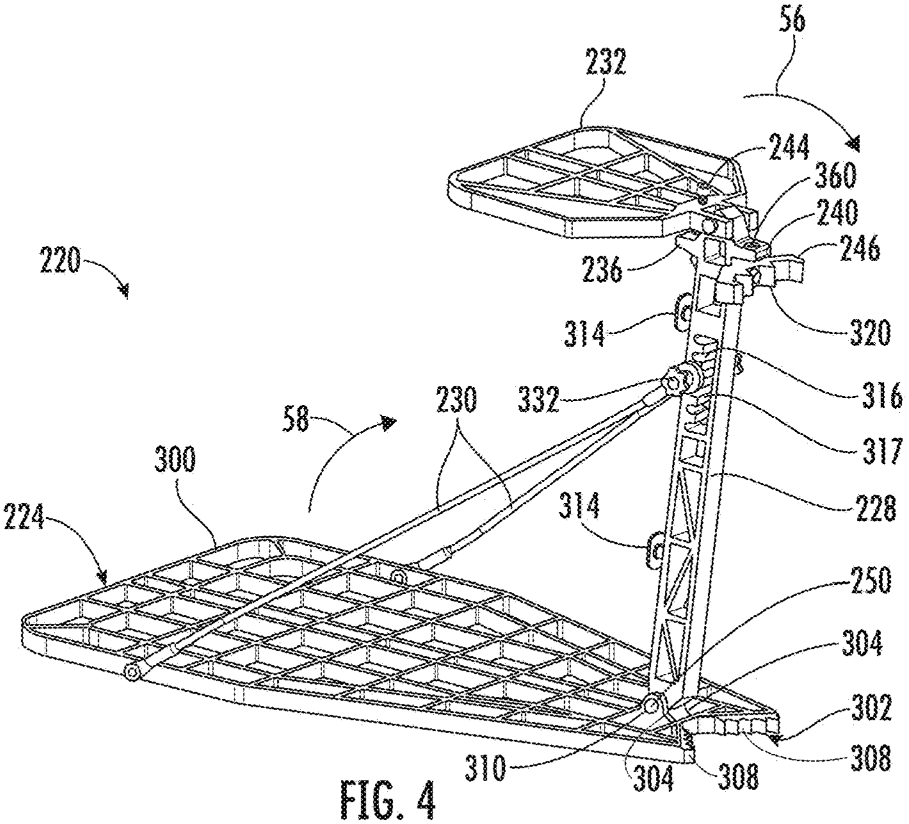
FIG. 4 is a perspective view of an example tree stand having a seat in a seat position.

FIG. 4 is a front perspective view of an example tree stand 220 in an in-use state, a state during which tree stand 20 may be positioned against or along a tree. As described above, tree stand 220 facilitates easier transport of the tree stand and additional gear. Tree stand 220 is collapsible or foldable to a state such that the tree stand may be carried along a person's back using shoulder straps, similar to a backpack. Tree stand 220 is foldable in a fashion such that the seat of the tree stand may serve as a shelf for supporting the additional gear when the tree stand is folded and carried along the person's back. Tree stand 220 utilizes a dual-purpose seat leveling shelf lock that controls the orientation of the seat to accommodate personal preferences or to accommodate mounting of the stand to non-vertical (tilted) portions of the tree. The dual-purpose seat leveling shelf lock further locks or retains the seat in a shelf position or orientation when the tree stand is folded and being transported. Tree stand 220 comprises platform 224, post 228, strut cables 230, seat 232, leveling tab 236, shelf tab 240, and seat leveling shelf lock 244.

Platform 224 comprises a panel or other structure upon which a person residing on tree stand 220 may stand and/or rest his or her feet. In the example illustrated, platform 224 comprises platform portion 300, claw portion 302 and post mounting ears 304. Platform portion 300 comprises an open grill or framework. In other implementations, platform 24 may comprise an imperforate panel or an imperforate panel having openings for receiving projections extending from post 228 when post 228 is folded against platform 224.

Claw portion 302 is provided on a front side of platform portion 300 and is configured to engage and grip the sides of a tree. In the example illustrated, claw portion 302 comprises a pair of diverging and angled toothed edges 308 that form an opening therebetween for receiving portions of a tree. In some implementations, claw portion 302 may be omitted, wherein other separate claws are provided along post to 28.

Post-mounting ears 304 project upwardly from a top surface of platform portion 300 proximate to claw portion 302. Post-mounting ears 304 receive post 228 and include a pair of aligned apertures through which a fastener 310 may extend, wherein the fastener 310 further extends through portions of post 228 to pivotally support post 228 for pivotable movement about a pivot axis 250 between the upright position shown in FIG. 4 and the folded position shown in FIG. 8.

Post 228 comprises an elongate structure that spaces and supports platform 224 and seat 232 along the example trunk 21 (shown in FIG. 1). In the example illustrated, post 228 additionally supports claw structure 246, cleats 314 and strut securement slots 316. Claw structure 246 is similar to claw portion 302 in that claw structure 246 is configured to extend between post 28 and the sides of trunk 21. Like claw portion 302, claw structure 246 comprises a toothed face 320 for gripping the sides of a tree. In the example illustrated, claw structure 246 is fastened to post 228 by a fastener 322. In other implementations, claw structure 246 may be integrally formed as part of a single unitary body with post 228.

Cleats 314 project from a side of post 228 opposite to that of toothed face 320. Cleats 314 each include a narrower neck 326 and a wider head portion 328. Cleats 314 are configured to secure a strap or cord, such as cord 48 (shown in FIG. 1) to post 228. As shown in FIG. 1, the cord 48 wraps about trunk 21.

Strut securement slots 316 comprise a series of vertically arranged slots that are angled in a downward direction towards a rear of platform portion 300. A vertical channel 317 extends along the ends of each of slots 316. Each of slots 316 is configured to receive the cylindrical portion of a fastener 332 which is secured to strut cables 230. Fastener 332 may be moved along channel 317 and selectively positioned within one of the slots 316 to adjust the location at which the ends of strut cables 230 are connected to post 228. Slots 316 facilitate adjustment of an angle at which platform 224 extends from post 228. As result, the angle of platform 224 may be adjusted to accommodate a person's individual preferences or to accommodate the circumstances where post 228 is secured along a portion of a tree that is non-vertical, that may be tilted. In some implementations, when post 228 is mounted on a tilted portion of tree, platform 224 and seat 232 may be adjusted so as to both obliquely project from post 228 such that both platform 224 and seat 32 are substantially horizontal, parallel to the horizon, despite the tilt of the tree. In other implementations, strut cables 230 may be selectively positionable along and mountable to post to 28 using other mechanisms. In some implementations, slots 316 may be omitted, where the end of strut cables 230 are fixedly secured at one location along post 228.

Struct cables 230 extend at an angle between post 228 and platform portion 300 of platform 224. Strut cables 230 support platform portion 300 relative to post 228. As discussed above, the location at which the ends of strut cables 230 are secured to post 228 may be adjusted to adjust the relative angle between platform portion 300 and post 228. In some implementations, the angle may alternatively be adjusted by adjusting the length of strut cables 230 and/or the location which strut cables 230 are attached to platform portion 300. In some implementations, the angle between platform portion 300 and post 228 may not be adjustable.

Figure 5:
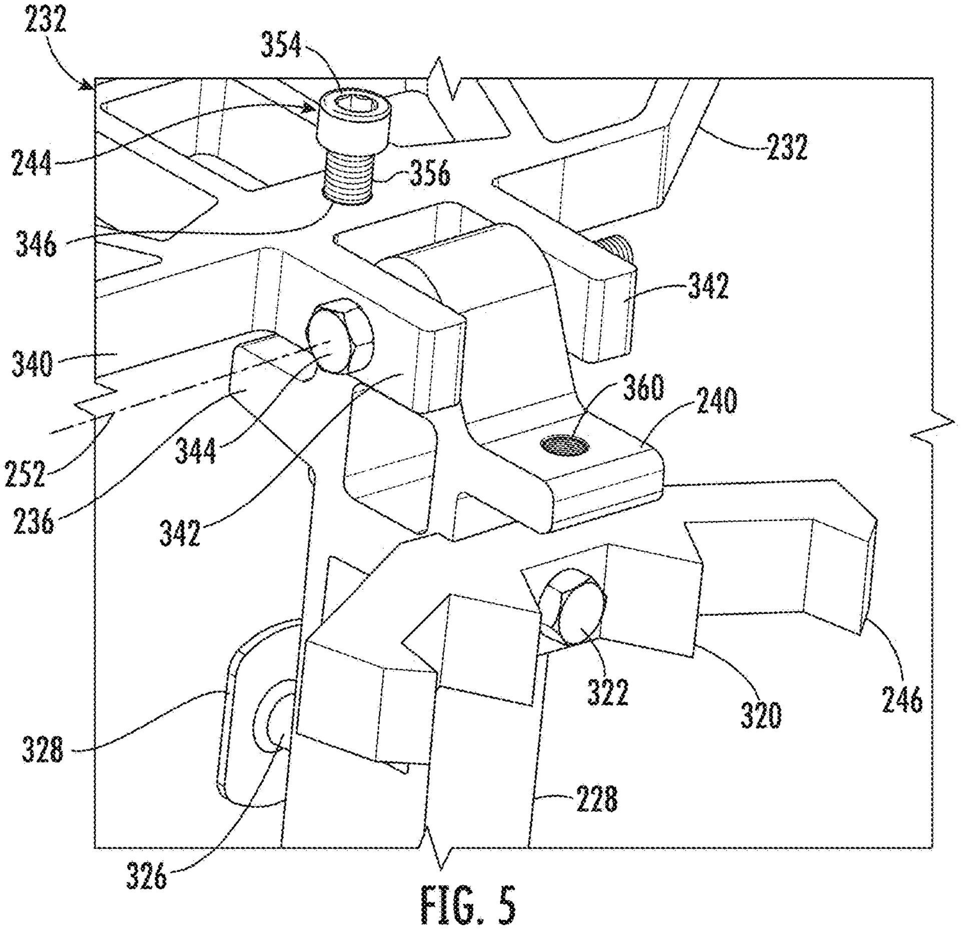
FIG. 5 is an enlarged perspective view of a portion of the tree stand of FIG. 4.
Figure 8:
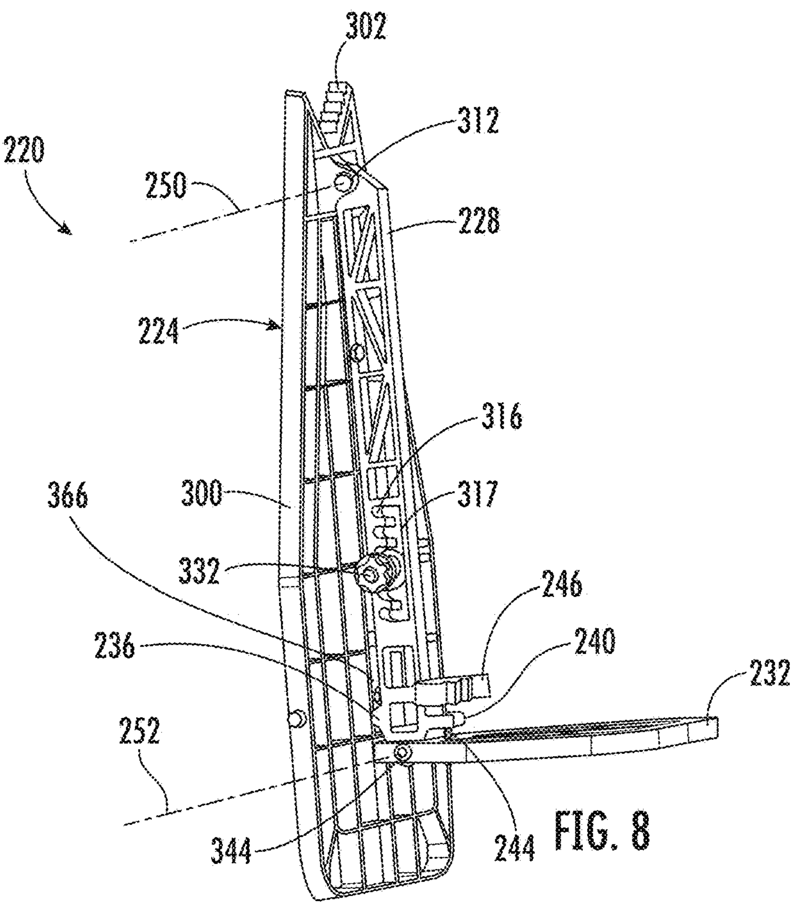
FIG. 8 is a perspective view of the example tree stand of FIG. 4 in a folded state with the seat in a shelf position.

Seat 232 comprises a platform upon which a person may be seated. Seat 232 is supported by post 228 so as to overhang and extend above platform 224 when seat 232 is in the seat position shown in FIG. 4. As shown by FIG. 5, seat 232 comprises a seat portion 340 and a pair of forwardly extending prongs 342 which are spaced to receive a top portion of post 228 therebetween. Fastener 344 (in the form of a bolt) passes through a pair of aligned openings in prongs 342 and through an aligned opening through the top of post 228 to pivotably support seat 232 for the pivoting of seat 232 relative to post 228 about axis 252. Seat 232 may pivot from the seat position shown in FIG. 4 to a shelf position as shown in FIG. 8. In the example illustrated, seat 232 is pivotable by at least 180 degrees about pivot axis 252 between the seat position and the shelf position.

Leveling tab 236 comprises a projection that extends from post 228 below pivot axis 252 (when seat 232 is oriented above platform 224 in the seat position). Leveling tab 236 is sized and located so as to be engageable by seat leveling shelf lock 244 when seat 232 is in the seat position shown in FIG. 4. In the example illustrated, tab 236 is integrally formed as a single unitary body with post 228. In some implementations, tab 236 is removably or fixedly mounted to post 228.

Shelf tab 240 comprises a projection that extends from post 228 on an opposite side of post as leveling tab 236. Shelf tab 240 is sized and located so as to be engageable by seat leveling shelf lock 244 when seat 232 is in the shelf position shown in FIG. 8. In some implementations, shelf tab 240 is integrally formed as a single unitary body with post 228. In some implementations, shelf tab 240 is removably or fixedly mounted to post 228.

Seat leveling shelf lock 244 comprises structure that is movably connected to and projects from seat 232. Lock 244 may be moved relative to seat 232 to adjust the length of lock 244 extending between leveling tab 236 and seat 232 to affect the angular positioning of seat 232 and to retain seat 232 in a selected angular position (about axis 52). For example, in some implementations, seat 232 may be retained in an orientation perpendicular to the longitudinal axis of post 228 such as when trunk 21 does not extend at an angle). In some implementations, lock 244 may cooperate with tab 236 to retain seat 232 in a downwardly tilted orientation or an upwardly tilted orientation to accommodate the preferences of the person using seat 232. In some implementations, lock 244 may cooperate with tab 236 retain seat in a downwardly tilted orientation relative to post 228 or an upwardly tilted orientation relative to post 228 such that seat 232 is horizontal despite post 228 being tilted due to trunk 21 being tilted (not perpendicular to the horizon).

Figure 6:
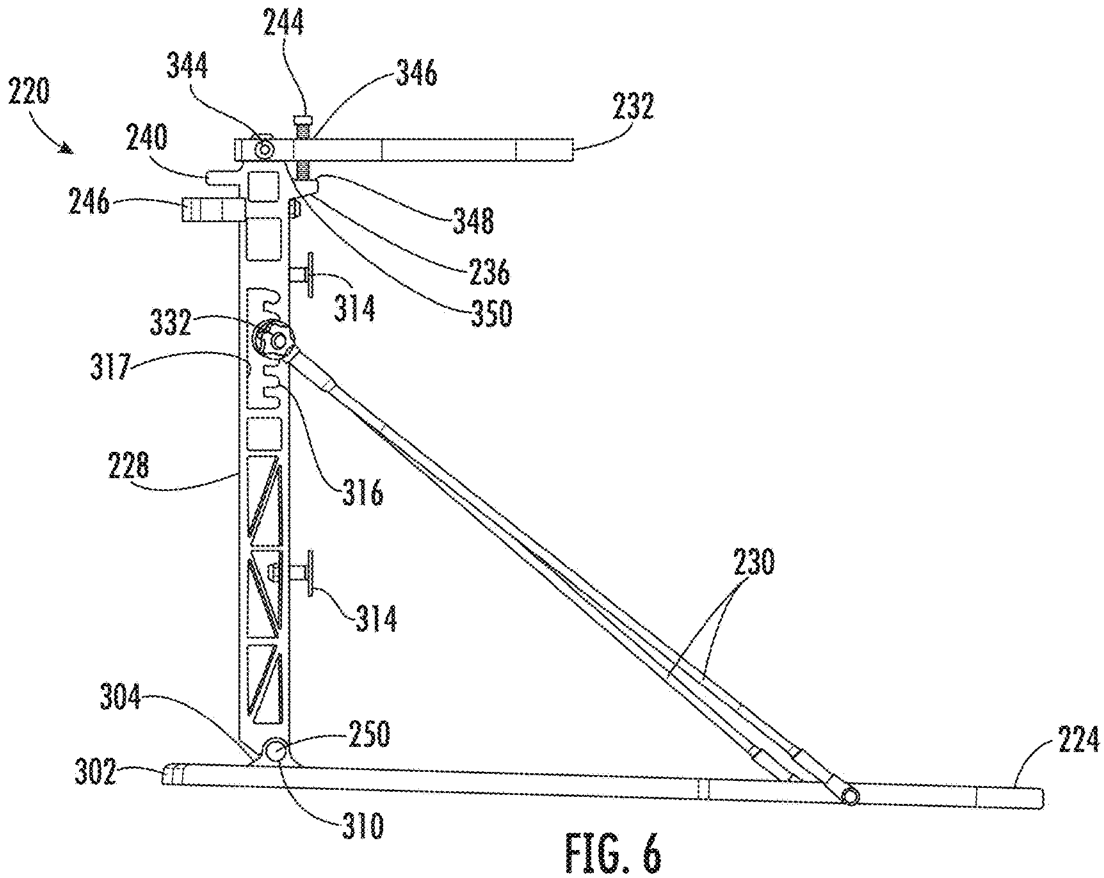
FIG. 6 is a side of the tree stand of FIG. 4 with the seat supported in a first seat position.
Figure 7:
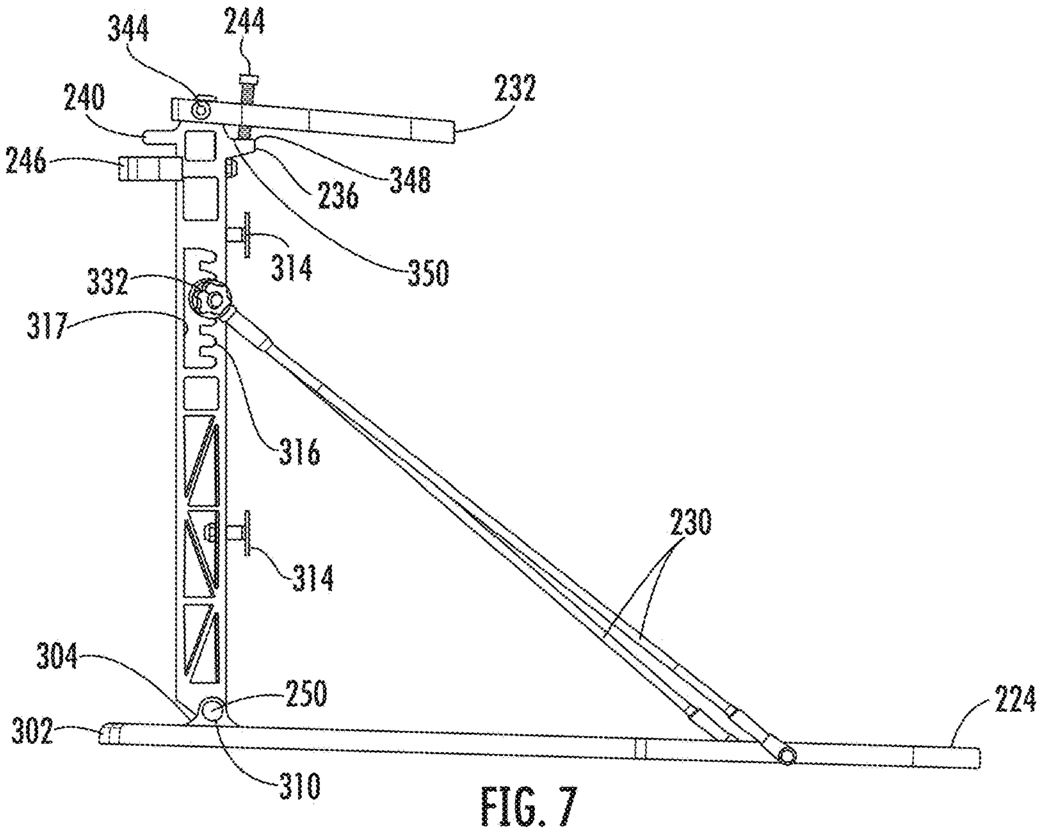
FIG. 7 is side view of the tree stand FIG. 4 with the seat supported in a second seat position.

FIGS. 6 and 7 illustrate lock 244 cooperating with shelf tab 236 to support seat 232 at two different angles relative to the longitudinal axis of post 228. FIG. 6 illustrates lock 244 engaging tab 236 to support seat 232 at a 90-degree angle relative to the longitudinal axis of post 228. Such an angle may be beneficial in circumstances where post 228 is secured along a vertical portion of a tree, one that is perpendicular to the horizon. FIG. 7 illustrates lock 244 engaging tab 236 to support seat 232 at an oblique downwardly tilted angle relative to the longitudinal axis of post 228. Such an angle may be beneficial in circumstances where the person using tree stand 220 prefers a downwardly angled seat, one that is downwardly angle relative to the horizon. Such an angle may also be beneficial in circumstances where post 228 is secured along a tilted portion of the tree, such as a portion of the tree that tilts upwardly to the left (as seen in FIG. 7), wherein seat 232 is tilted downwardly to the right (as seen in FIG. 7) such that seat 232 is horizontal, parallel to the horizon.

In the example illustrated, lock 244 comprises a fastener in the form of a threaded bolt. Seat 232 comprises an internally threaded bore 346 having a centerline located so as to intersect leveling tab 236 when seat 232 is in the seat position. Lock 244 is threaded through the internally threaded bore 346 until its lower axial end 348 rests upon or abuts the top surface 350 of leveling tab 236. The established distance between the top surface 350 of tab 236 and seat 232 (and the corresponding angular positioning of seat 232 relative to post 228) may be adjusted by rotating lock 244.

In other implementations, the lower end of lock 244 may be turned or threaded into an internally threaded bore formed in tab 236. In some implementations, lock 244 may pass into or through an unthreaded bore or opening in leveling tab 236 and may be threaded through a nut above and resting upon leveling tab 236, wherein the positioning of the nut along the bolt may be adjusted to adjust the levelness of seat 232. In other implementations, other fasteners may be used to adjust the levelness or angle of seat 232 relative to post 228.

FIG. 8 illustrates tree stand 220 in a collapsed or folded state. To move tree stand 220 from the in-use state shown in FIG. 4 to the collapsed or folded state shown in FIG. 8, seat 232 is pivoted about axis 252 in the direction indicated by arrow 56 shown in FIG. 4. Seat 32 is pivoted to a position such that lock 244 may engage shelf tab 240.

Figure 9:
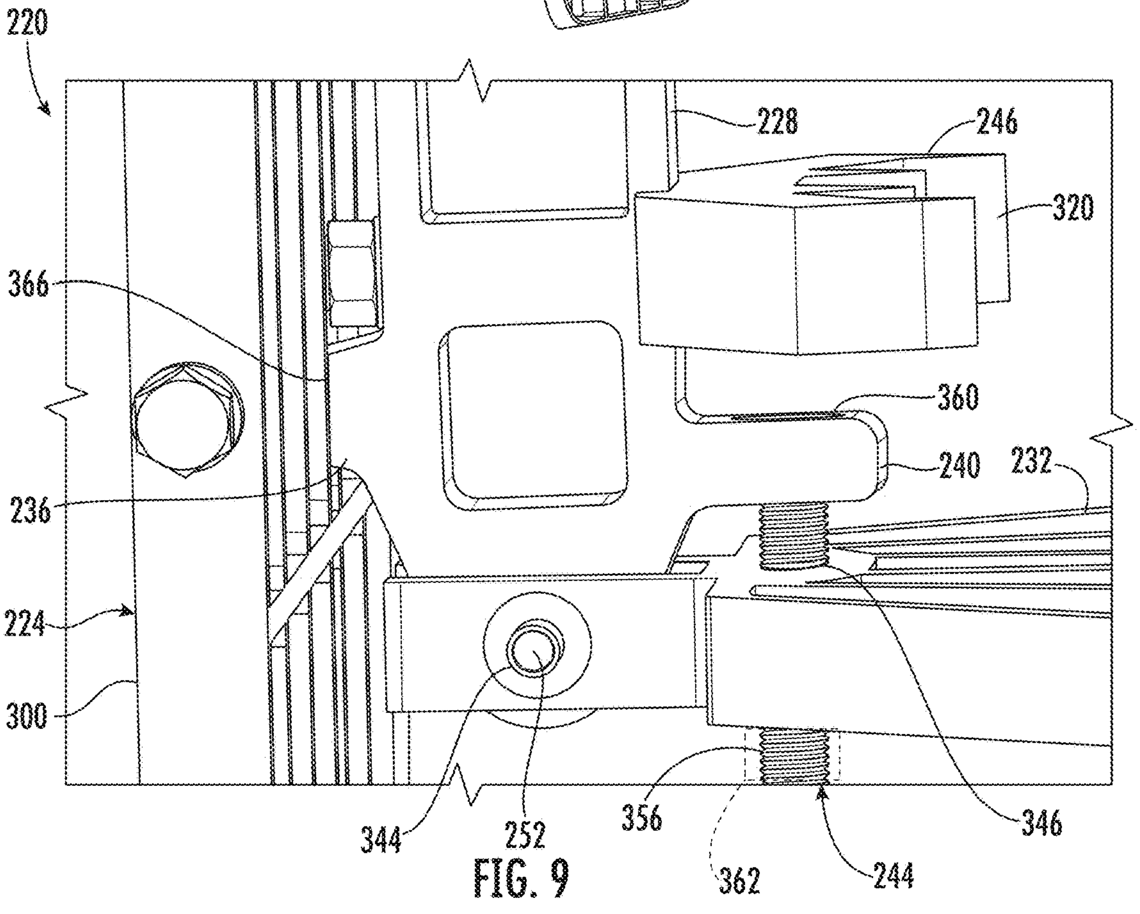
FIG. 9 is an enlarged perspective view illustrating portions of the example tree stand of FIG. 8.

As shown by FIG. 9, in the example illustrated where lock 244 is in the form of a threaded bolt having a head 354 and a threaded shaft portion 356 (shown FIG. 5). Lock 244 engages seat 232 by locating the head 354 of the bolt within a countersunk aperture 360 formed in shelf tab 240 and by threading the threaded shaft portion 356 into the internally threaded bore 346 in seat 232. Seat 232 may be pivoted about axis 252 to raise the head 354 out of the countersunk aperture 360 to provide access to head 354 for rotating lock 244. At the selected position, head 354 may be once again lowered into the countersunk aperture 360, suspending seat 232 at the selected angle. In some implementations, in lieu of head 354 having an Allen wrench interface, head 354 may comprise a polygonal (hex) outer circumferential side for rotation of lock 244.

As shown in broken lines, in some implementations, tree stand 220 may additionally comprise a nut 362, such as a lock nut, threaded onto shaft portion 356 below seat 232. In such an implementation, countersunk aperture 360 may be configured to inhibit rotation of lock 244 when head 354 is received within aperture 360. For example, head 354 may have a hexagon outer circumferential surface, whereas the countersunk hole has corresponding hexagon interior sides. As a result, nut 362 may be rotated to raise or lower (pivot) seat 232.

In some implementations, lock 244 may "engage" shelf tab 240 in other fashions. For example, in some implementations, countersunk aperture 360 may be replaced with an internally threaded bore, wherein lock 244 is threaded through the internally threaded bore of shelf tab 240 and into the internally threaded bore 346 of seat 232, wherein the head 354 resides above shelf tab 240. In some implementations, countersunk aperture 360 may be replaced with an internally threaded bore, wherein lock 244 (in the form of the illustrated threaded bolt) is inverted with threaded shaft portion 356 threaded through seat 232 and into the internally threaded bore of tab 240, with head 354 residing below seat 232 and supporting seat 232.

In some implementations, bore 346 may be unthreaded and larger than the diameter of threaded shaft portion 356 but smaller than the internal diameter of nut 362. In such an implementation, nut 362 may be threaded onto the end of threaded portion 356, below seat 232, to support seat 232 in the shelf position. Nut 362 may be threaded onto threaded shaft portion 356 above leveling tab 236 so as to rest upon leveling tab 236 when seat 232 is in the shelf position shown in FIG. 4). In some implementations, leveling tab 236 may include an opening through which portions of threaded shaft portion 356 extend or are received, depending upon the position of nut 362 axially along threaded shaft portion 356. In such an implementation, relative rotation of the nut 362 and/or lock 244 may adjust the levelness of seat 232 in the seat position.

In some implementations, lock 244 may be configured to snap or otherwise releasably connect to shelf tab 240 to retain in the shelf position shown in FIG. 8. In the illustrated example, lock 44 is dual-purpose in that the same lock 244 retain seat 232 in both the seat position and the shelf position. Lock 244 is configured to be detached from seat 32 and reconnected, joining seat 32 to either leveling tab 236 when seat 232 is in the seat position or shelf tab 240 when seat 232 is in the shelf position. In other implementations, separate locks or separate fasteners may be employed. For example, a first lock 244 may be used when seat 232 is to be secured in the seat position shown in FIG. 8 and a second different lock 244 may be used when seat 232 is to be secured in the shelf position shown in FIG. 8.

To further move tree stand 220 to the collapsed or folded state, post 228 is pivoted about axis 250 in the direction indicated by arrow 58 shown in FIG. 4. This results in post 228 being close to parallel or parallel with platform 24. In the example illustrated, platform portion 300 of platform 224 is provided with an opening 366 configured to receive leveling tab 236 when post 228 has been pivoted to the folded position shown in FIG. 8. As result, post 228 may be positioned in closer proximity and parallel or near parallel to platform 224.

Figure 10:
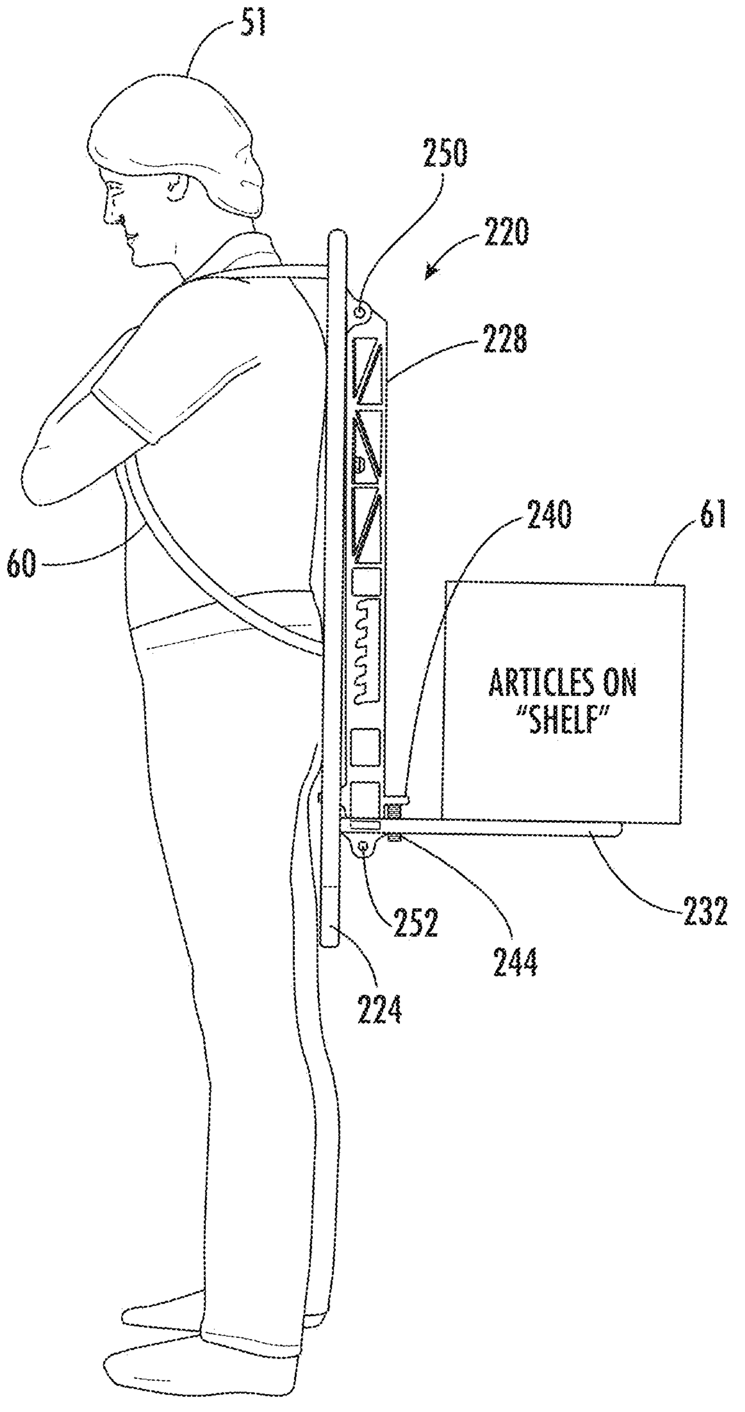
FIG. 10 is a side view of the example tree stand of FIG. 4 in the folded state while being transported by a person with articles supported on the seat in the shelf position.

FIG. 10 illustrates tree stand 220 in the collapsed or folded state while being transported by a person 51. As shown by FIG. 10, when in the collapsed or folded state, platform 224 forms a back backing, wherein post 228 extends substantially down the center of platform 224 with platform 224 sandwiched between post 228 and the back of person 51. Seat 232 projects outwardly from post 228 and from platform 224 to serve as a shelf.

As shown by FIG. 10, tree stand 220 may additionally include a shoulder strap 60 connectable at opposite ends to at least one of platform 224 and/or post 228 to facilitate carrying of tree stand 220 in a fashion similar to a backpack. As shown by FIG. 10 articles 61 may rest upon seat 232. In some implementations, additional securement mechanisms may be provided on seat 232, such as cleats, projections or the like, to facilitate securement of such articles on the shelf provided by seat 232 with bungee cords, straps or the like.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one him in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first," "second", "third" and so on in the claims merely distinguish different elements and, unless otherwise stated, are not to be specifically associated with a particular order or particular numbering of elements in the disclosure.

What is claimed is:

1. A tree stand comprising:

a platform;

a post pivotably connected to the platform, the post being pivotable between an upright position relative to the platform and a folded position along the platform;

a seat pivotably connected to the post, the seat being pivotable by at least 180 degrees between a seat position and a shelf position;

a leveling tab extending from the post;

a shelf tab extending from the post; and a seat leveling shelf lock movably connected to and projecting from the seat, wherein the seat is pivotable between a first position in which the seat leveling shelf lock engages the leveling tab to establish an angle of the seat relative to the post in the seat position while the post is in the upright position and a second position in which the seat leveling shelf lock engages the shelf tab to retain the seat in the shelf position while the post is in the folded position.

2. The tree stand of claim 1, wherein the platform comprises an opening receiving the leveling tab when the post is in the folded position.

3. The tree stand of claim 2, wherein the leveling tab and the post are integrally formed as a single unitary body.

4. The tree stand of claim 3, wherein the shelf tab and the post are integrally formed as a single unitary body.

5. The tree stand of claim 4, wherein the seat leveling shelf lock is removable from the seat.

6. The tree stand of claim 5, wherein the seat comprises an internally threaded bore and wherein the seat leveling shelf lock comprises an external thread, the seat leveling shelf lock being threaded through the internally threaded bore and being translatable by rotation of the seat leveling shelf lock relative to the seat.

7. The tree stand of claim 6, wherein the seat is pivotable by at least 180 degrees between the seat position and the shelf position.

8. The tree stand of claim 6, wherein the seat leveling shelf lock extends through the shelf tab while the post is in the folded position.

9. The tree stand of claim 1, wherein a majority of the seat extends from a first side of the post when in the seat position and extends from a second side of the post when in the shelf position, wherein the leveling tab extends from the first side of the post and wherein the shelf tab extends from the second side of the post.

10. The tree stand of claim 1, wherein the leveling tab, the shelf tab, and the post are integrally formed as a single unitary body.

11. The tree stand of claim 10, wherein the leveling tab the, the shelf tab, in the post are cast from aluminum as a single unitary body.

12. The tree stand of claim 1, wherein the seat leveling shelf lock is removable from the seat.

13. The tree stand of claim 1, wherein the seat comprises an internally threaded bore and wherein the seat leveling shelf lock comprises an external thread, the seat leveling shelf lock being threaded through the internally threaded bore and being translatable by rotation of the seat leveling shelf lock relative to the seat.

14. The tree stand of claim 1, wherein the seat leveling shelf lock extends through the shelf tab while the post is in the folded position.

15. The tree stand of claim 1, wherein the seat leveling shelf lock comprises a bolt and a nut threaded onto the bolt.

16. The tree stand of claim 1, wherein the leveling tab and the shelf tab extend from opposite sides of the post and wherein the leveling tab is offset relative to the shelf tab along a longitudinal axis of the post.

17. The tree stand of claim 1 further comprising a shoulder strap connectable to at least one of the platform and the post when the post is in the folded position and while the seat is in the shelf position.

18. The tree stand of claim 1, wherein the seat has a first face and a second opposite face, wherein the first face provides an upwardly facing user seating surface configured to support a person resting on top of the user seating surface when the seat is in the seat position and wherein the second face provides a shelf surface configured to support articles resting on top of the shelf surface seat when the seat is in the shelf position.

19. A tree stand comprising:

a platform;

a post pivotably connected to the platform, the post being pivotable between an upright position relative to the platform and a folded position along the platform;

a seat pivotably connected to the post, the seat being between a seat position and a shelf position;

a leveling tab extending from the post;

a shelf tab extending from the post; and a seat leveling shelf lock movably connected to and projecting from the seat, wherein the seat is pivotable between a first position in which the seat leveling shelf lock engages the leveling tab to establish an angle of the seat relative to the post in the seat position while the post is in the upright position and a second position in which the seat leveling shelf lock engages the shelf tab to retain the seat in the shelf position while the post is in the folded position, wherein the platform comprises an opening receiving the leveling tab when the post is in the folded position.

20. A tree stand comprising:

a platform;

a post pivotably connected to the platform, the post being pivotable between an upright position relative to the platform and a folded position along the platform;

a seat pivotably connected to the post, the seat being between a seat position and a shelf position;

a leveling tab extending from the post;

a shelf tab extending from the post; and a seat leveling shelf lock movably connected to and projecting from the seat, wherein the seat is pivotable between a first position in which the seat leveling shelf lock engages the leveling tab to establish an angle of the seat relative to the post in the seat position while the post is in the upright position and a second position in which the seat leveling shelf lock engages the shelf tab to retain the seat in the shelf position while the post is in the folded position, wherein the seat leveling shelf lock is removable from the seat.

* * * * *